United States Patent [19]

Kirk

[11] Patent Number: 5,663,810
[45] Date of Patent: Sep. 2, 1997

[54] METHOD AND APPARATUS FOR PRODUCING A DIGITAL HALF-TONE REPRESENTATION OF AN IMAGE

[75] Inventor: Richard A. Kirk, Herts, United Kingdom

[73] Assignee: Crosfield Electronics Limited, Herts, United Kingdom

[21] Appl. No.: 408,299

[22] Filed: Mar. 22, 1995

[30] Foreign Application Priority Data

Mar. 23, 1994 [GB] United Kingdom ............... 9405723

[51] Int. Cl.$^6$ ........................................ H04N 1/40
[52] U.S. Cl. ........................ 358/456; 358/298; 358/534
[58] Field of Search ........................... 358/456–460, 358/298, 534–536, 429; 382/237, 252, 270

[56] References Cited

U.S. PATENT DOCUMENTS

| | | | |
|---|---|---|---|
| 4,578,714 | 3/1986 | Sugiura et al. | 358/283 |
| 5,109,282 | 4/1992 | Peli | 358/458 |
| 5,243,443 | 9/1993 | Eschbach | 358/456 |
| 5,271,070 | 12/1993 | Truong et al. | 382/50 |
| 5,278,671 | 1/1994 | Takahashi et al. | 358/456 |
| 5,309,254 | 5/1994 | Kuwabara et al. | 358/456 |
| 5,321,525 | 6/1994 | Hains | 358/456 |
| 5,341,224 | 8/1994 | Eschbach | 358/456 |
| 5,467,201 | 11/1995 | Fan | 358/456 |
| 5,586,203 | 12/1996 | Spaulding et al. | 382/270 |

FOREIGN PATENT DOCUMENTS

WO90/09075  8/1990  WIPO.

OTHER PUBLICATIONS

Goertzel, Gerald et al., "Digital Halftoning on the IBM 4250 Printer," *IBM Journal of Research and Development,* (1987) Jan., No. 1, pp. 2–15, Armonk, NY, USA.

*Patent Abstracts of Japan,* vol. 16, No. 45, (E–1162), Nov., 1991.

Pappas, Thrasyvoulos et al., "Model–Based Halftoning," SPIE, vol. 1453, Human Vision, Visual Processing and Digital Display II (1991), pp. 244–255.

Ulichney, Robert, "Dithering with Blue Noise," IEEE, 1988.

*Primary Examiner*—Edward L. Coles, Sr.
*Assistant Examiner*—Stephen Brinich
*Attorney, Agent, or Firm*—Sughrue, Mion, Zinn, Macpeak & Seas

[57] ABSTRACT

In a method of producing a digital half-tone representation of an original image, wherein the representation is constituted by an array of output cell values representing the colour content of pixels of the original image, cell values are determined for successive output cells, for which cell values have not previously been determined. An output cell value is generated with reference to an input cell value related to the colour content of a corresponding pixel in the original image, and any error values propagated from previous iterations. Where the output cell value satisfies a predetermined condition, the effective colour content of a neighbourhood of previously determined output cell values is determined by addressing a look-up table containing a single value for each neighbourhood. An error value constituted by the difference between the effective colour content and the corresponding input cell value is determined and propagated for use in subsequent iterations.

16 Claims, 9 Drawing Sheets

| a | d | A |
|---|---|---|
| b | X | B |
| c | D | C |

| No | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| UNIT | 1 | 01 | 0 1 | 10 00 | 01 10 | 01 11 | 0 1 1 | 10 10 01 01 | 110 100 | 00 10 11 | 11 10 00 | 001 010 100 | 100 010 001 | 110 101 011 | 011 101 110 | 0011 0110 1100 1001 | 1001 1100 0110 0011 |

(0 = WHITE, 1 = BLACK)

Fig. 10.

$$M = \begin{pmatrix}
0 & 0 & 0 & 0 & 0 & 0 & 0 & 0 & 0 & 0 & 0 & 0 & 0 & 0 & 0 & 1 \\
0 & \frac{1}{2} & 0 & 0 & 0 & 0 & 0 & 0 & 0 & 0 & 0 & 0 & 0 & 0 & 0 & 0 \\
0 & 0 & 0 & 0 & \frac{1}{2} & 0 & 0 & 0 & 0 & 0 & 0 & 0 & 0 & 0 & 0 & 0 \\
\frac{1}{4} & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & \frac{1}{2} & 0 & 0 & 0 & 0 & 0 & 0 \\
0 & 0 & 0 & 0 & 0 & \frac{1}{4} & 0 & 0 & 0 & 0 & \frac{1}{4} & 0 & \frac{1}{4} & 0 & 0 & 0 \\
0 & 0 & 0 & 0 & 0 & 0 & 0 & \frac{1}{3} & 0 & 0 & 0 & \frac{1}{3} & 0 & 0 & 0 & 0 \\
0 & 0 & \frac{1}{4} & 0 & 0 & 0 & 0 & 0 & \frac{1}{4} & 0 & 0 & 0 & 0 & 0 & 0 & 0 \\
0 & \frac{1}{3} & 0 & 0 & 0 & 0 & 0 & 0 & 0 & 0 & 0 & 0 & 0 & \frac{1}{6} & 0 & 0 \\
0 & 0 & 0 & \frac{1}{6} & \frac{1}{6} & 0 & 0 & 0 & 0 & 0 & 0 & \frac{1}{6} & 0 & 0 & 0 & 0 \\
0 & 0 & 0 & 0 & 0 & \frac{1}{6} & \frac{1}{6} & 0 & \frac{1}{6} & 0 & 0 & 0 & 0 & 0 & 0 & 0 \\
0 & 0 & \frac{1}{3} & 0 & 0 & 0 & 0 & 0 & 0 & 0 & 0 & 0 & 0 & 0 & 0 & 0 \\
0 & 0 & 0 & 0 & 0 & 0 & \frac{1}{3} & 0 & 0 & 0 & \frac{1}{3} & 0 & 0 & 0 & 0 & 0 \\
0 & 0 & 0 & 0 & 0 & 0 & 0 & \frac{1}{3} & 0 & 0 & 0 & 0 & 0 & 0 & 0 & 0 \\
0 & 0 & 0 & 0 & 0 & 0 & 0 & 0 & 0 & \frac{1}{3} & 0 & 0 & \frac{1}{3} & 0 & 0 & 0 \\
0 & 0 & 0 & \frac{1}{4} & 0 & 0 & \frac{1}{4} & 0 & 0 & 0 & 0 & 0 & 0 & 0 & 0 & 0
\end{pmatrix}$$

↓ PATTERN (rows 0–15); element at row 4, column 50 is circled $\frac{1}{2}$.

Fig.11A.

PATTERN COLOUR DENSITY = NO. DENSITY OF BLACK CELLS IN PATTERN × NEIGHBOURHOOD COLOUR DENSITY

(0) $\begin{matrix} 1 & 1 & 1 & 1 \\ 1 & 1 & 1 & 1 \\ 1 & 1 & 1 & 1 \\ 1 & 1 & 1 & 1 \end{matrix}$ = 1 × $\begin{matrix} & 1 \\ 1 & 1 \\ 1 & 1 \end{matrix}$ (15)

Fig.11C.

(4) $\begin{matrix} 0 & 1 & 0 & 1 \\ 1 & 0 & 1 & 0 \\ 0 & 1 & 0 & 1 \\ 1 & 0 & 1 & 0 \end{matrix}$ = 1/2 × $\begin{matrix} & 1 \\ 0 & 1 \\ 1 & 0 \end{matrix}$ (10)

Fig.11D.

(6) $\begin{matrix} 0 & 0 & 0 & 0 & 0 \\ 1 & 1 & 1 & 1 & 1 \\ 1 & 1 & 1 & 1 & 1 \\ 0 & 0 & 0 & 0 & 0 \\ 1 & 1 & 1 & 1 & 1 \\ 1 & 1 & 1 & 1 & 1 \end{matrix}$ = $\left( 1/3 \times \begin{matrix} & 0 \\ 1 & 1 \\ 1 & 1 \end{matrix} \right)$ + $\left( 1/3 \times \begin{matrix} & 1 \\ 0 & 1 \\ 0 & 1 \end{matrix} \right)$ (7) (12)

Fig.12.

| abcd | 0 | 1 | 2 | 3 | 4 | 5 | 6 | 7 | 8 | 9 | 10 | 11 | 12 | 13 | 14 | 15 | PATTERN |
|---|---|---|---|---|---|---|---|---|---|---|---|---|---|---|---|---|---|
| 0000 | 0 | 0 | 0 | 4 | 0 | 0 | 0 | 0 | 0 | 0 | 0 | 0 | 0 | 0 | 0 | 0 | |
| · | 0 | 2 | 0 | 0 | 0 | 0 | 0 | 0 | 0 | 0 | 0 | 0 | 0 | 0 | 0 | 0 | |
| · | 0 | 0 | 0 | 0 | 0 | 0 | 0 | 0 | 0 | 0 | 0 | 3 | 0 | 0 | 0 | 0 | |
| · | 0 | 2 | 0 | 0 | 0 | 2 | 0 | 0 | -3 | 0 | -3 | 0 | 3/2 | -3/2 | 0 | 4 | |
| · | 0 | 0 | 2 | 0 | 0 | 0 | 0 | 0 | 0 | 0 | 0 | 0 | 0 | 0 | 0 | 0 | |
| · | 0 | 2 | 0 | 0 | 0 | 2 | 0 | 0 | -3 | 0 | 3 | 0 | -3/2 | -3/2 | 0 | 0 | |
| · | 0 | -2 | 0 | 0 | 0 | -2 | 0 | 0 | 3 | 0 | 3 | 0 | -3/2 | 3/2 | 0 | 0 | |
| · | 0 | 2 | 2 | 0 | 0 | 2 | 3 | 0 | -3 | -6 | -3 | 0 | 3/2 | -3/2 | 0 | 4 | |
| · | 0 | 0 | 0 | 0 | 0 | 0 | 0 | 0 | 0 | 0 | 0 | 0 | 3 | 0 | 0 | 0 | |
| · | 0 | 0 | 0 | 0 | 0 | 0 | 0 | 4 | 0 | 0 | 0 | -3 | 0 | 0 | 0 | 0 | |
| · | 0 | 0 | 0 | 0 | 2 | 0 | 0 | 0 | 0 | 0 | 0 | 0 | 0 | 0 | 0 | 0 | |
| · | 0 | 2 | 0 | 0 | 0 | 2 | 0 | 0 | -3 | 0 | -3 | 0 | 3/2 | 3/2 | 0 | 0 | |
| · | 0 | -2 | -2 | 0 | 0 | -2 | 0 | 0 | 3 | 6 | 3 | 0 | -3/2 | 3/2 | 0 | -4 | |
| 1101 | 0 | 0 | 0 | 0 | -2 | 0 | 0 | 0 | 0 | 0 | 0 | 0 | 0 | 0 | 3 | 0 | |
| · | 0 | -4 | 0 | 0 | 0 | 0 | 0 | 0 | 6 | 0 | 0 | 0 | 0 | 0 | 0 | 0 | |
| 1111 | 1 | 0 | 0 | 0 | 0 | 0 | 0 | 0 | 0 | 0 | 0 | 0 | 0 | 0 | 0 | 0 | |

| PATTERN NO. | % DOT. |
|---|---|
| 0 | 100 |
| 1 | 55 |
| 2 | 64 |
| 3 | 34 |
| 4 | 73 |
| 5 | 88 |
| 6 | 75 |
| 7 | 67 |
| 8 | 61 |
| 9 | 61 |
| 10 | 61 |
| 11 | 47 |
| 12 | 45 |
| 13 | 84 |
| 14 | 83 |
| 15 | 61 |
| 16 | 59 |

Fig.14.

| NEIGHBOURHOOD NO. | % DOT. |
|---|---|
| 0 | 136 |
| 1 | 110 |
| 2 | 141 |
| 3 | 105.5 |
| 4 | 128 |
| 5 | 92.5 |
| 6 | 138.5 |
| 7 | 72.5 |
| 8 | 135 |
| 9 | 127 |
| 10 | 146 |
| 11 | 113.5 |
| 12 | 132.5 |
| 13 | 103 |
| 14 | 146 |
| 15 | 100 |

METHOD AND APPARATUS FOR PRODUCING A DIGITAL HALF-TONE REPRESENTATION OF AN IMAGE

FIELD OF THE INVENTION

The invention relates to methods and apparatus for producing a digital half-tone representation of an image.

DESCRIPTION OF THE PRIOR ART

A digital half-tone representation of a continuous tone image may be printed with amplitude modulated dots whose sizes vary with the required colour density in the corresponding region of the original image. Alternatively, the half-tone dots may be frequency modulated by varying the spatial density of identical dots in a particular area to obtain an effective colour density which varies as required.

Figure 3A:
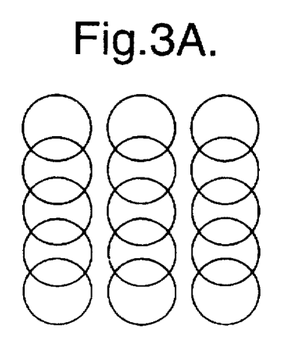
FIGS. 3A–3B are diagram illustrating the effect of dot overlap on effective neighbourhood colour density.
Figure 3B:
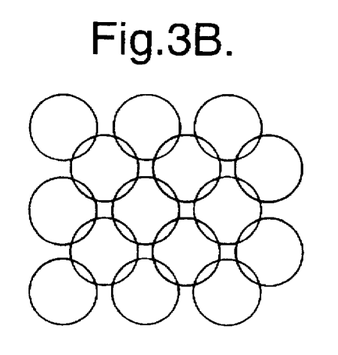

Conventionally, the effective colour density of an array of frequency modulated half-tone dots is determined strictly in accordance with the number density of dots. This does not take into account dot overlap, i.e. the effect of the overlap of a dot printed in one dot cell area with neighbouring dot cell areas or Yule-Neilsen effects because the paper is not opaque over distances of the order of the dot widths. FIG. 3 illustrates the effect of dot overlap on effective colour density. A and B contain the same number of dots/cm$^2$ but arranged on a square lattice in different ways. We can see they have different effective % dot values. Any FM screening algorithm that takes no account of neighbourhood will not distinguish between them. Their half-tones will have regions of both patterns and so will appear either mottled or noisy because they have injected noise to break up the patterns.

Ulichney (IEEE Proceedings 76, p56–79 (1988)) has avoided effects of this kind by introducing a random element into the error diffusion process.

Conventional dot overlap models, as shown for example in "Model Based Half-Toning" (Pappas and Neuhoff—SPIE, Volume 1453, Human Vision, Visual Processing, and Digital Display II (1991)), involve measurements of the grey level value due to various dot patterns within a finite window around the element, e.g. a 3×3 window. The effective grey level for each dot pattern is used in the half-tone screening algorithm to calculate the error values which are propagated from the current element and its nearest neighbours to the neighbours yet to be calculated. However, the dot overlap compensation model used in this paper does not consider the fact that each measured pattern contains a number of "neighbourhoods". Therefore, it is assumed that for a particular dot neighbourhood the effective dot value corresponds with the measured grey level of a periodic array of identical neighbourhoods with the uncalculated elements being set to zero.

The binary values of the uncalculated neighbours in the 3×3 window are assumed to be zero, and therefore as the content of each new cell is calculated, the effective dot value of each of the previously calculated neighbouring cells will change if the new cell is designated as "black", since their neighbourhood pattern will change. This requires further processing power since the corresponding error values must be re-calculated.

SUMMARY OF THE INVENTION

This invention provides a more faithful image with less artifacts than the prior art by providing a more accurate effective dot value for each cell, which takes into account dot overlap and the neighbourhood pattern provided by the current cell and its nearest neighbours for which values have previously been determined.

In accordance with one aspect of the present invention, we provide a method of producing a digital half-tone representation of an original image where, the representation is constituted by an array of output cell values representing the colour content of pixels of the original image. The method determines cell values for successive output cells, for which cell values have not previously been determined, by:

(1) generating an output cell value with reference to an input cell value related to the colour content of a corresponding pixel in the original image, and any error values propagated from previous performances of step (3);

(2) where the output cell value satisfies a predetermined condition, determining the effective colour content of a neighbourhood of previously determined output cell values by addressing a look-up table containing a single value for each neighbourhood; and (3) determining the difference between the effective colour content and the corresponding input cell value, and propagating the difference for use in subsequent performances of step (1).

In accordance with a second aspect of the present invention, we provide apparatus for producing a digital half-tone representation of an original image. The representation is constituted by an array of output cell values, representing the colour content of pixels of the original image. The apparatus determines cell values for successive output cells, for which cell values have not previously been determined, by:

(1) generating an output cell value with reference to an input cell value related to the colour content of a corresponding pixel in the original image, and any error values propagated from previous performances of step (3);

(2) where the output cell value satisfies a predetermined condition, determining the effective colour content of a neighbourhood of previously determined output cell values by addressing a look-up table containing a single value for each neighbourhood; and (3) determining the difference between the effective colour content and the corresponding input cell value, and propagating the difference for use in subsequent performances of step (1).

The dot overlap model in Pappas is employed for the current cell regardless of its output value. In the present invention, step (2) is only carried out when the output cell value satisfies a predetermined condition.

Preferably, the output cell values are binary values, i.e. the output cell value determines whether or not a dot is printed in the cell area when the image is printed, and the effective colour content is only calculated when the current cell is black.

Typically, step (2) is only carried out when the current output value is black, and the effective colour content is set to zero if the current cell is white.

The dot overlap compensation model used in Pappas does not take into account the important much longer range effects due to light diffusion within the paper, nor does it attempt to break up the regular patterns when the form.

The first effect can cause errors in the tone, particularly for very low or very high dot percentages where the effective period for the pattern are very large. This problem is typically overcome in the present invention by using a separate input LUT (tone curve) with its own calibration stage.

The second effect can give sharp contrasts in texture and visible artifacts at boundaries between different patterns or similar patterns with different phase.

Random noise is typically added to the error value to ensure that there is always some randomizing process at work. However, unchecked, this would introduce dots into regions of 0% and 100% tint. While the actual error in the tone would be very small, The dots are very visible against the clear background.

Therefore, in a preferable embodiment of the present invention these problems are overcome by combining the dot overlap error generation (for the short range effects) with a filtered random signal (to break up the patterns). Also, a binary mask may be used (to ensure the black and white limits stay solid).

The neighbourhood of previously determined cells may comprise four of the nearest cells in a square array or three of the nearest cells in an hexagonal array. Alternatively, the neighbourhood may extend further than the nearest neighbours. There are five calculated points in the square neighbourhood if we include the current point. We may, however, assume the overlap of all neighbourhoods where the current point is light is zero without introducing any errors, provided the effective values for the other neighbourhoods where the current point is dark is calculated accordingly. This reduces the total number of independent patterns to be measured down to 16. See the section "Calculation of effective neighbourhood % dot" for more details. Preferably, the values in the look-up table are determined with reference to a set of calibration patterns, each calibration pattern containing one or more neighbourhoods. The colour density of each calibration pattern is determined (for example by measurement). Each neighbourhood's effective colour content is determined by adding a predetermined fraction of the measurements from one or more calibration patterns. The predetermined fraction is determined by calculating a matrix which converts from neighbourhood patterns to calibration patterns, and inverting it. Typically at least some of the neighbourhoods are calculated using more than one calibration pattern.

Typically, each cell's error value is calculated by comparing the cell's effective neighbourhood colour density with the required density in the original image as represented by an input pixel value which may vary typically from 0 to 255.

A two dimensional filtered noise signal may also be added to the error values in order to prevent periodic artifacts in the final image.

Typically, the effective neighbourhood colour density is set to 0 if the output cell value is 0 and if the input pixel value is 0% (white) or 100% (black) the effective neighbourhood colour density is set to 0% or 100%. This prevents black or white "holes" being printed in what should be entirely black or white areas.

The cell values may be determined sequentially according to a conventional raster pattern, alternatively they may be scanned using a serpentine raster (i.e. each scan line scanning in alternate directions). Preferably, the image is scanned with a double serpentine raster (i.e. the scan direction reversing every other line) with adjacent lines being calculated in parallel.

BRIEF DESCRIPTION OF THE DRAWINGS

An example of method and apparatus according to the present invention will now be described with reference to the accompanying drawings, in which:

FIG. 11 illustrates the relationship between neighbourhood patterns and calibration patterns;

DETAILED DESCRIPTION OF THE EMBODIMENT

Figure 1:
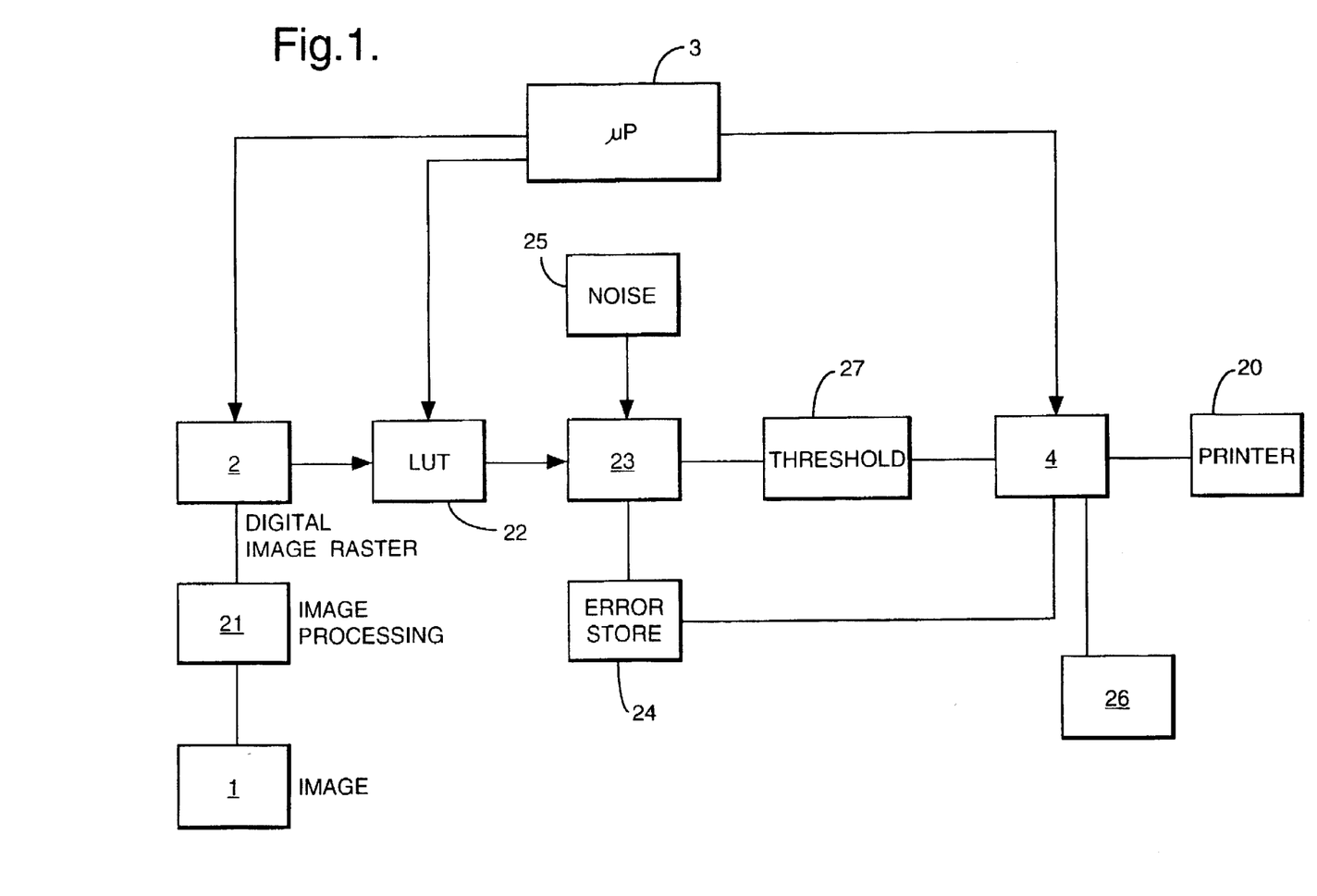
FIG. 1 is a schematic diagram of the apparatus.

Initially, an original image 1 (shown in FIG. 1) which may comprise a continuous tone image, is rasterized by an image processor 21 yielding input pixel data which is stored in an input store 2. This step may include replication or interpolation of the image data. The input pixel data may comprise an 8 bit word for each pixel, i.e. the colour density of each element of the original image corresponding to an input pixel is represented by a digital number from 0–255. The input pixel data is then processed under the control of a microprocessor 3 to produce an output binary cell value at 4. The input pixel data addresses input LUT 22 whose output is added to the store 23. Errors from previously calculated cells are added from an error store 24, along with a random signal from a noise generator 25. The total stored in 23 is then thresholded at 27 to produce an output cell value at 4, which is either stored at 26, or printed by a printer 20.

Figure 2:
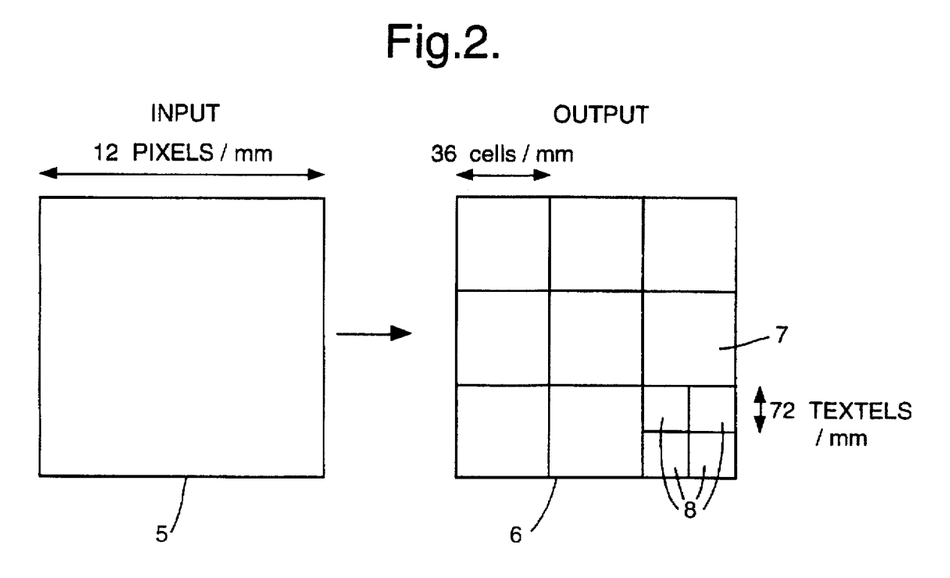
FIG. 2 illustrates an input pixel and the corresponding output cell and textel areas.

FIG. 2 illustrates typical regions of the input and output images. 5 represents the area of a pixel of the original image. This pixel is scanned to produce a pixel data value from 0 to 255.

6 represents the corresponding area of the output which is stored at 26 or printed at 20. This area is made up of a 3×3 array of cells 7. Each cell 7 is represented in the image store 26 by a binary value. Depending on the printer, the dots may be made up of a number of textel dots 8 shown in FIG. 2. A textel dot is the smallest element that may be printed by the output printer 20. Typical frequencies are 12 pixels/mm, which produce an FM half-tone bit map at 36 cells/mm, which is then output at 72 textels/mm.

The method will be described as though the final image has only one colour separation. If the image has more than one separation a similar process is carried out on each separation.

Figure 4:
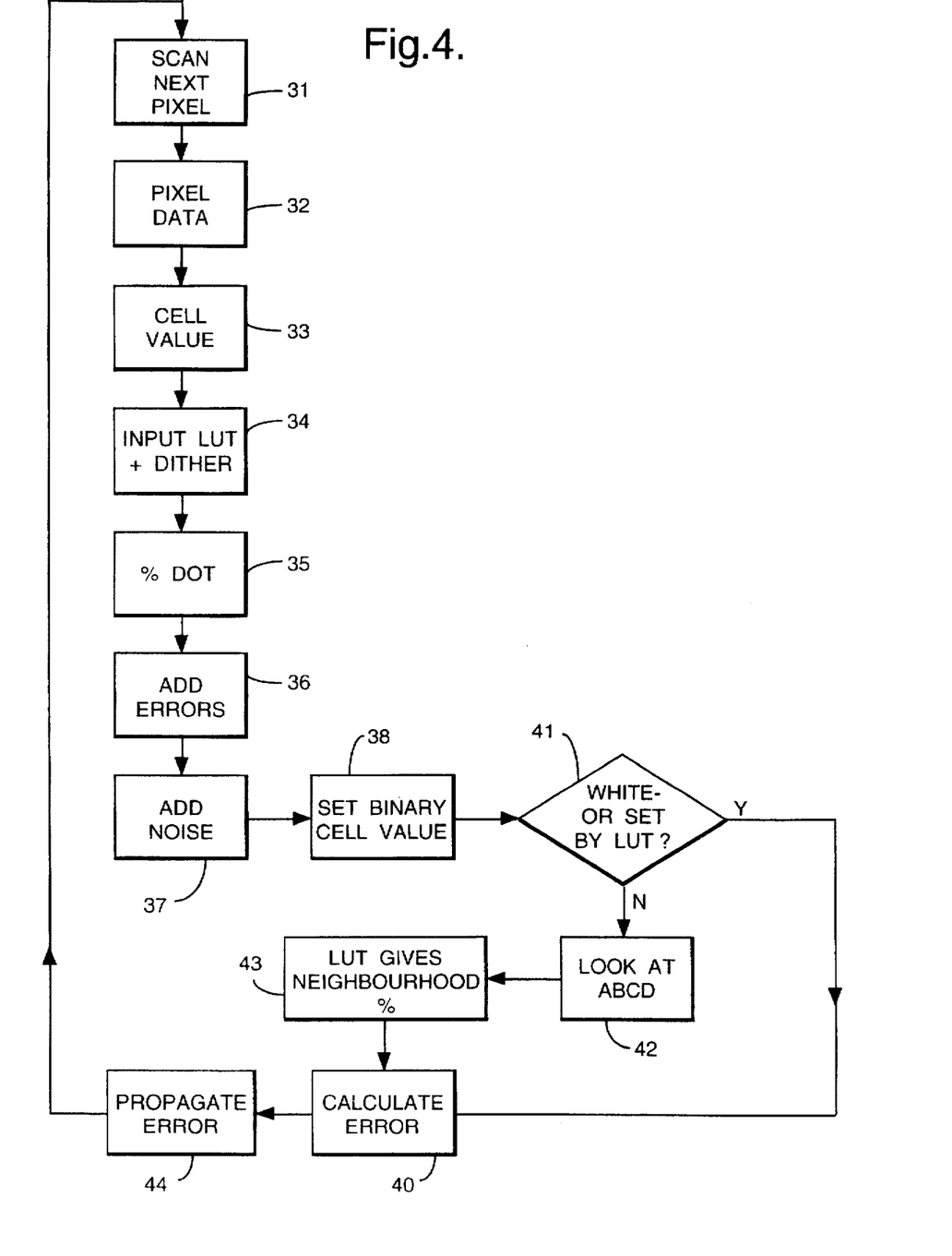
FIG. 4 is a flow diagram illustrating the method of the invention.

FIG. 4 illustrates the various stages of the screening process. This will be described with reference to the apparatus shown in FIG. 1. At 31 an original image pixel is scanned by scanner 21 to produce input pixel data 32. The pixel data is converted into input cell values 33.

Each input cell value needs to be sorted into three classes . . .

(1) cells that must be printed white ($\leq 0\%$ dot);
(2) cells that must be half-toned ($0 < \%$ dot $< 100$); and
(3) cells that must be printed black ($\geq 100\%$ dot).

This is necessary because noise and propagating errors in the FM half-toning algorithm can otherwise put dots into regions that ought to be solid white or black.

Figure 5A:
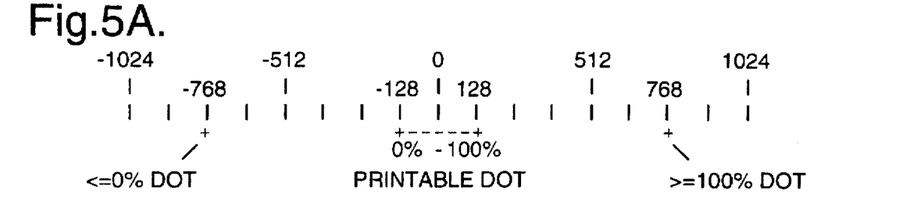
FIG. 5A illustrates the effect of the 2-bit LUT which determines the class of the input cell value.

This may be achieved using a 2-bit look-up table. The 0–255 input cell value is centred on 0, and the white and black input values are offset to +/−768, as shown in FIG. 5A.

For (1) and (3) we have all the data we need. For (2) a tone corrected measure of the effective % dot is required for the cell.

In software where precision is not usually a problem this would be provided by a simple look-up table 22. In hardware, where it may be necessary to restrict the number of bits to keep the process rapid and compact, the input values are looked up in a table with random dithering, e.g. by adding a 2-bit random integer.

The effective value for cases (1) and (3) is zero.

The input LUT table 22 is useful for making smooth corrections to the tone curve of the process, and for stretching the 0–100% dot printable range to fit the digital range of the processors.

Figure 7:
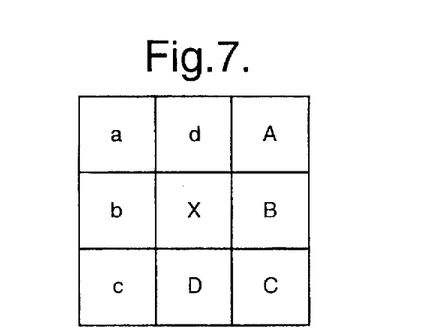
FIG. 7 is a 3×3 cell window centred on the current cell.

The input cell value is then modified by adding errors from the neighbouring cells which are stored in error store 24. This is necessary since only two levels—black or white—may be printed in any one cell so it is unlikely that the value will be matched precisely (unless it is 0 or 100%). It will probably be necessary to carry over some error signal to the calculation of the next cell. This shall be described with reference to FIG. 7. FIG. 7 shows the current cell X, surrounded by four previously calculated nearest neighbours a–d, and four nearest neighbours A–D which have not been calculated yet. The screening process runs down the lines from d to D, and successive lines are processed from left to right. In general, in a square array there will be 4 neighbouring cells that have been calculated which propagate their errors to the current cell. The error values are added to the current effective cell % dot.

Figure 5B:
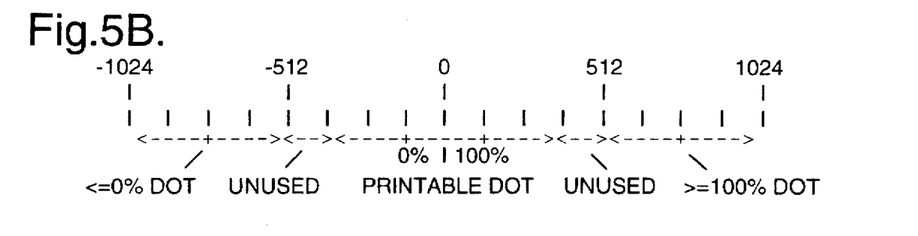
FIG. 5B illustrates the full range of the corrected input cell value.

A noise signal is added at 37 from noise generator 25 to break up some of the patterns which may result from error propagation and overprinting, and to provide a random "seed" for the error propagation after a large block or solid tint. After this step, assuming the total errors are ranged from −255 to 255, the signed 11-bit range may be filled as shown in FIG. 5B. This represents the total which is stored at 23 in FIG. 1.

Figure 6A:
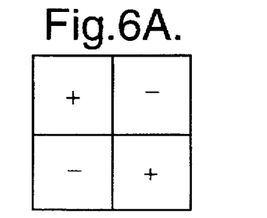
FIG. 6A is a diagram illustrating the filter which is used to add noise to a 2×2 region.

Instead of adding a random value separately to each cell, it is preferable to add/subtract random values ranged between −NOISE and NOISE to each 2*2 region of cells, shown in FIG. 6A.

This is just as effective in breaking up the patterns, but because the signal sums to zero in either direction, there should be no long-period visible components to this signal. In effect we have generated a 2-D random signal then applied a 2-D high-pass filter.

Figure 6B:
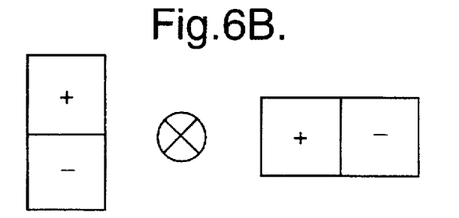
FIG. 6B illustrates the effect of convolution of two 1D filters.

This filter can be viewed as the convolution of two 1-D filters, shown in FIG. 6B.

This can be used to generate the random signals in neater and more compact ways.

Typical values for NOISE as a fraction of the 0–100% range are . . .

40%—best for single separations
60%—best for overprints

The method of generating final output cell values and corresponding error values is shown in FIG. 4 at 38–43.

In these steps the process determines the bit value for the current cell and the errors to be propagated to the neighbouring cells that have not been calculated yet. There are four of these (A–D), shown in FIG. 7.

The algorithm runs vertically in the direction —d—x— D—→

The printed values and errors are generated as follows . .

(1) First at 38 the binary print value for the cell is determined. If the input tables set the print value (ie. the input value is black or white) then the algorithm skips straight to step 40. Otherwise the bit value is set to white if the corrected input cell value (ie. with the errors and noise signal added) is negative, and black if it is not.

(2) If the cell is white, then the process jumps straight from 41 to step 40. If the cell is black then it will have an effective % dot value that must be subtracted from the corrected input cell value before propagating the remaining error to the neighbours. This % dot value will be affected by overlap from the previous cells a–d. A 4 bit number is made at 42 from the 4 binary values for cells in the neighbourhood, then the effective neighbourhood % dot value is looked up at 43, and subtracted from the corrected input cell value.

(3) The resulting error value is divided up at 44 between the neighbours A,B,C,D in the ratio 1:2:1:4 respectively. The division must be done in such a way that the total of the propagated errors comes to the original value.

Figure 8A:
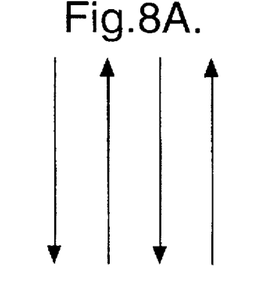
FIG. 8A illustrates a serpentine raster.

So far the description might imply the algorithm always runs the same way along the line. In fact many troublesome patterns may be avoided by periodically reversing the direction of the scan. Many authors have used the "Serpentine raster" where alternate lines are processed in the opposite direction, shown in FIG. 8A.

Figure 8B:
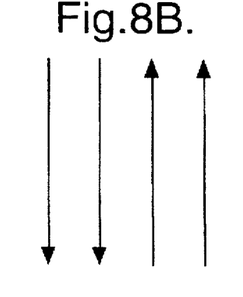
FIG. 8B illustrates a double serpentine raster.

This is a nuisance for parallel architectures because you do not calculate the first cell on the next line until the previous line is finished. An alternative is the "Double Serpentine Raster". Here pairs of lines are reversed, as shown in FIG. 8B.

The calculation on the second line can start when the second cell on the first line is complete. We have also found this is better at breaking up long range patterns. Higher order serpentine rasters are possible, but you can sometimes see their repeat.

Figure 4A:
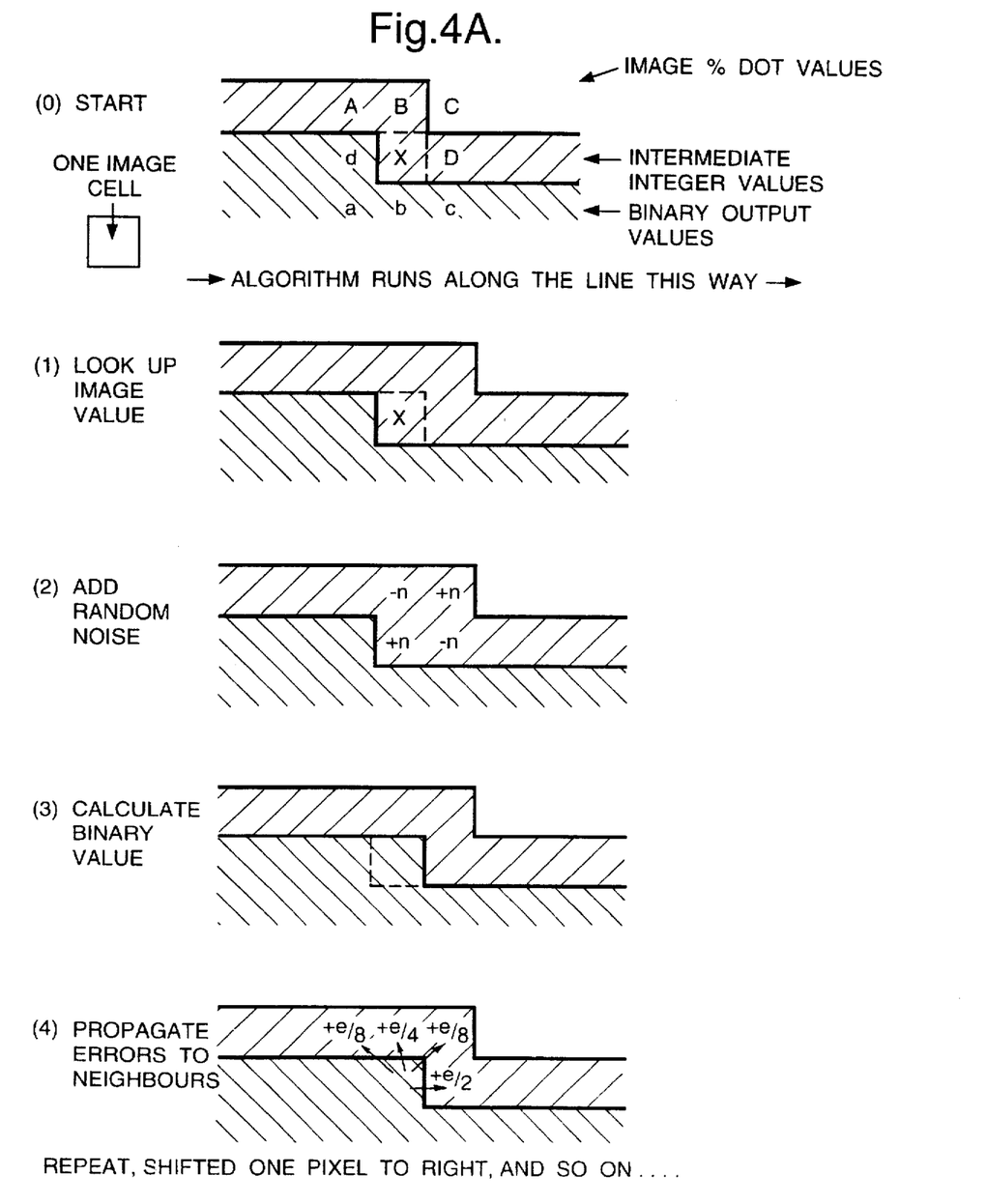
FIG. 4A is a schematic diagram of the algorithm moving across an image.

FIG. 4A is a schematic diagram of how the screening algorithm moves across the image. In this Figure, the lines have been rotated by 90° and the algorithm runs along the lines from left to right.

Calculation of Effective Neighbourhood % Dot

When the centre spot of the 5-cell neighbourhood (x) is white, then the effective % dot for that cell is taken to be 0%. Therefore the white cells are not compensated for dot overlap. However, this does not affect the method's accuracy: it only affects which cell we choose to say the overlap "belongs" to. It is assumed that the effective % dot of the centre cell includes all the dark overlap of the centre cell with the ones yet to be calculated. A number of similar assumptions could have been made, but this is one of the simplest.

It is necessary to measure the effective % dot for the 16 neighbourhoods with x dark, and all the combinations of light and dark at a–d. Let us number these 16 neighbourhoods from 0 to 15 using the binary values in the order abcd.

Some of these values can be measured from a single calibration pattern, but most patterns contain more than one neighbourhood.

The set of calibration patterns should not have two patterns with the same ratio of neighbourhoods in. This would mean we had not got 16 independent measurements, so we could not solve for all our 16 variables. Similarly no combination of patterns should be equivalent to another. What we are trying to do is to construct a 16*16 matrix that transforms a pattern vector to a neighbourhood vector, then invert it to transform our % dots from patterns to neighbourhoods. To be invertible this matrix must have a determinant that is not zero, and ideally is well away from zero.

We need another set of 16 patterns for doing an identical calibration when the scan is running in the other direction assuming the spot is not symmetric. In fact we can use 15 of the previous 16 patches, so we only needed to add one extra patch.

Figure 9:
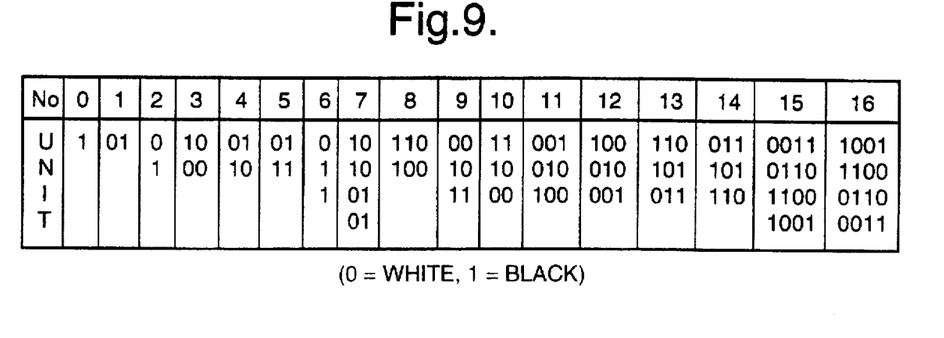
FIG. 9 illustrates the 17 calibration patterns.

The 17 patterns are illustrated in FIG. 9, with 0 representing white, and 1 black.

Measurements are made of a periodic array of the calibration patterns 0–15 to generate the % dot table for the scans running down the page as the unit cells are drawn. If we then swap the measurements for the last 4 pairs of patches (9 & 10, 11 & 12, 13 & 14, 15 & 16) we then have the equivalent set of measurements for scans running up the page.

These patterns were the subset of all the 5*5 and smaller patterns that gave the 16*16 normalized matrix with the greatest determinant.

Figure 10:
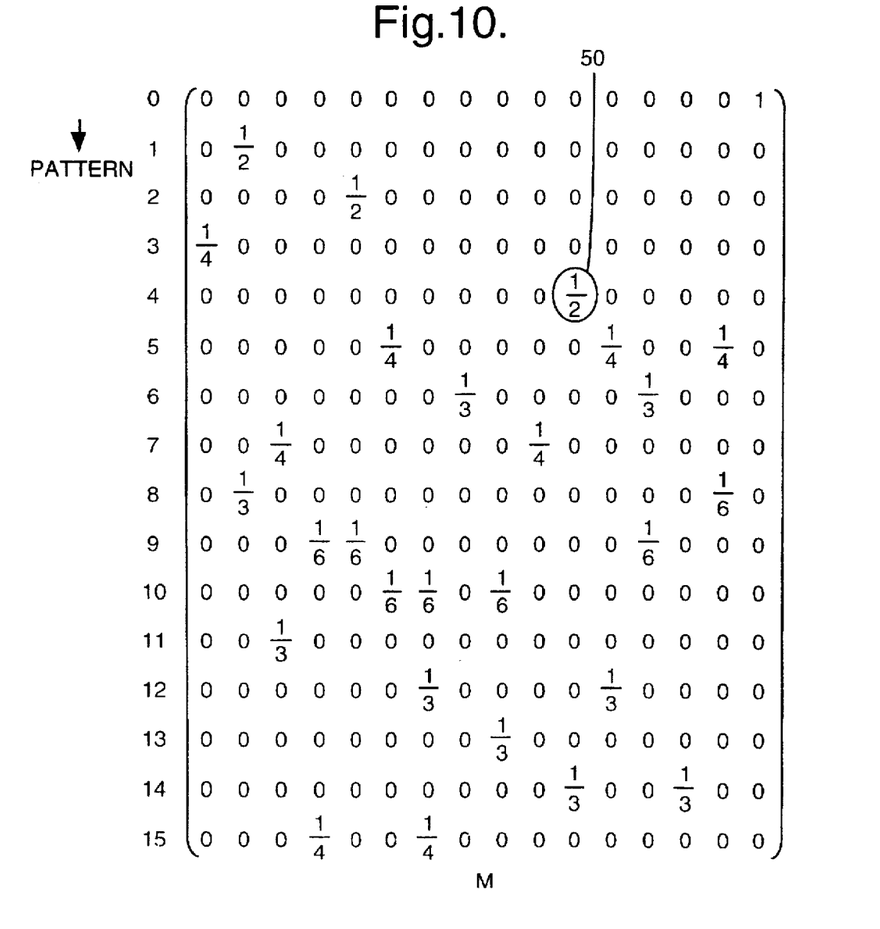
FIG. 10 is the matrix of the fraction of each neighbourhood in each calibration pattern.

The matrix M of the fraction of each neighbourhood in each pattern is shown in FIG. 10. Each row corresponds to a particular pattern and each column corresponds to a particular neighbourhood represented by the binary number abcd. FIG. 11A shows how matrix M is related to the calibration pattern colour content P and the effective neighbourhood colour density N. Most rows do not sum to 1. We have left out all the white cells, so the sum of any row will be the fraction of black cells in the calibration pattern.

The first line of this matrix shows that the pattern 0 (solid black) is composed of 100% of neighbourhood 15 (abcd= 1111) as one would expect. This is illustrated in FIG. 11B. Clearly pattern (0) contains neighbourhood (15) as indicated in dotted lines. Similarly, FIG. 11C shows that pattern 4 (a "chess-board" pattern) is composed of 50% of neighbourhood 10 (as read off by the matrix entry indicated at 50). In contrast, pattern 6 is composed of ⅓ of neighbourhoods 7 and 11. Pattern 6 contains both neighbourhoods, as indicated in dotted lines.

Figure 12:
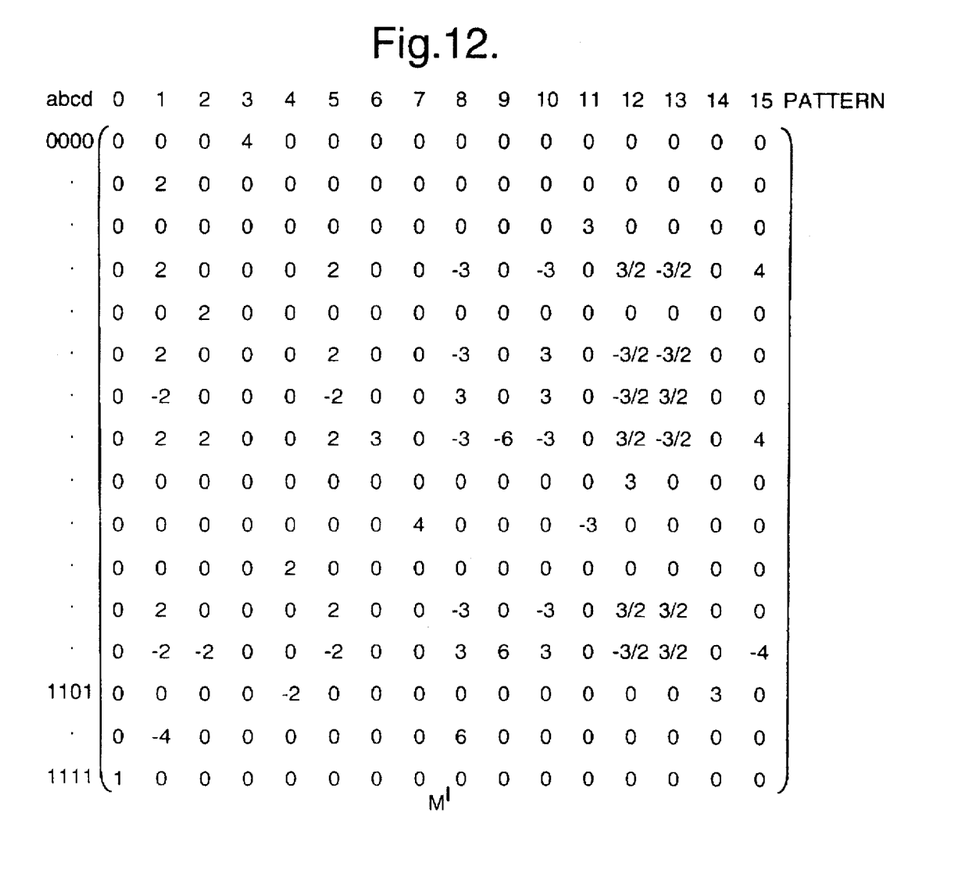
FIG. 12 is the inverse of the matrix in FIG. 9 which is used to convert from neighbourhood to patterns.

The inverse M' of this matrix is shown in FIG. 12. This matrix converts from pattern numbers to neighbourhoods. The bottom line of M' shows the composition of neighbourhood 15 (1111). Any linear property such as % dot of neighbourhood 15 is 1 times the pattern 0 (solid black value)+0 x all the others as we might expect. Similarly, neighbourhood 0 is calculated as 4 times the % dot of pattern 3, because 1 cell in 4 of pattern 3 is dark with the surrounding neighbourhood 0, and the rest are light.

The formulae for neighbourhoods like 3, 7 or 12 are more complex.

To calibrate, we print 0 and 100% patches and the 16 patterns, then measure their % dots on a densitometer. The test pattern we use also has a white square at the beginning. White and black should be 0% and 100%.

Figure 13:
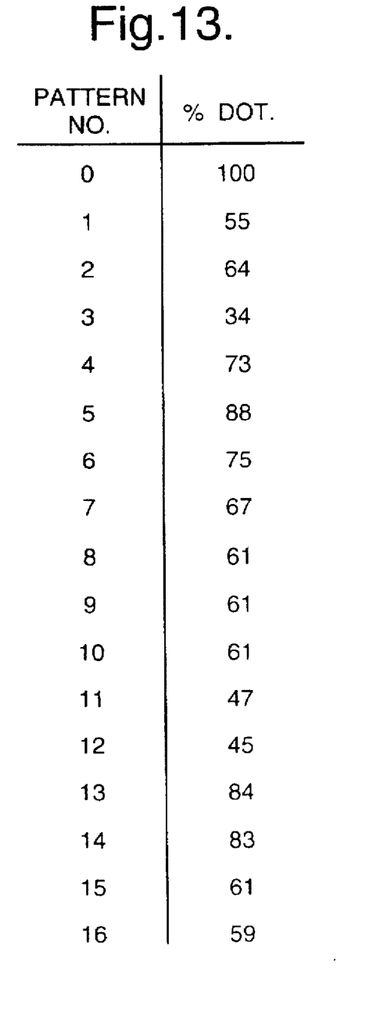
FIG. 13 is an example of the measured colour content of each calibration pattern; and, FIG. 14 shows the entries in the LUT for each neighbourhood.

A typical list of measurements is shown in FIG. 13. These values were obtained for a 6×6 expose machine at 36 1/mm. Multiplying any row in the matrix by values 0–15 gives you the effective % dot for that neighbourhood with the FM algorithm running down the lines. Note that the symmetrical pairs of patterns (11,12), (13,14) and (15,16) have different measurements since the printed dots are not perfectly circular.

Figure 14:
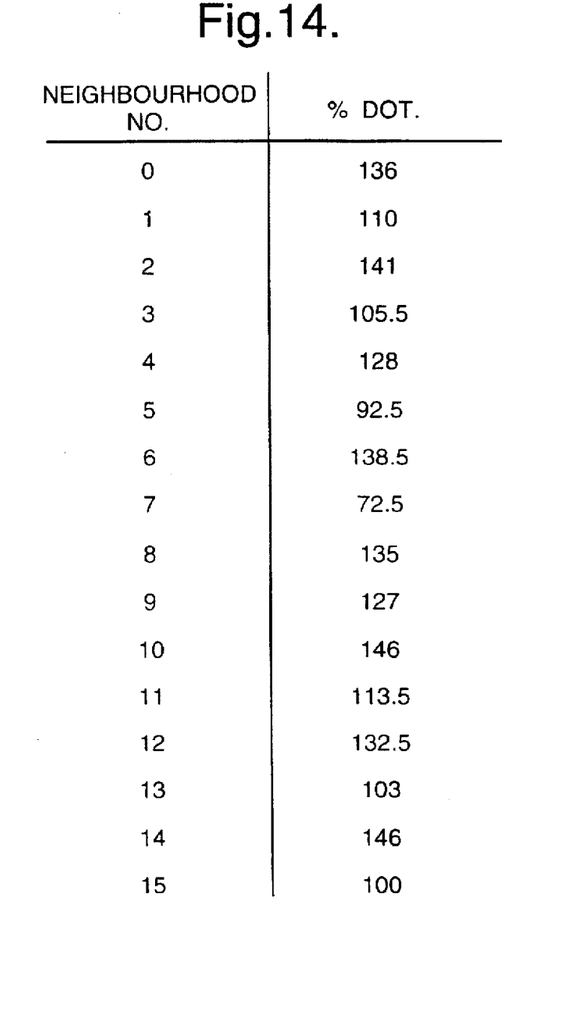

The values for each of the neighbourhoods is shown in FIG. 14 which corresponds with the LUT which is addressed at 43 in FIG. 4. These were calculated with reference to the measured values in FIG. 13. Swapping the last four pairs of values and repeating gives the values with the FM algorithm running up the lines. The effective % dot for neighbourhood 0 (A,B,C,D=0) is 136%. This makes sense if the isolated dot is spreading significantly into its blank neighbours, and the blank neighbours are not assigned with any of the overlap.

Once this calibration is complete, the FM screener can screen another test image with a series of patches with nominal % dot values. This can be used to set up the tone correction in the input LUTS to correct for Yule-Neilson and other long-range effects.

I claim:

1. In a method of producing a half-tone representation of an original image, the representation comprising an array of output cell values respectively representing the colour content of pixels of the original image, the improvement comprising generating a plurality of electrical signals indicating cell values for successive output cells, for which cell values have not previously been determined, by:

(a) generating electrical signals indicating an output cell value of each respective pixel of the half-tone representation with reference to an input cell value related to the colour content of a corresponding pixel in the original image;

(b) where the output cell value satisfies a predetermined condition, generating color content signals indicating an effective colour content of a neighbourhood of previously determined output cell values by addressing a look-up table containing a single value for each neighbourhood;

(c) generating difference signals indicating a difference between the effective colour content and the corresponding input cell value;

(d) adding a further signal having a random value to the difference signals calculated in said step (c) for propagation with the difference signals; and (e) repeating step (a) using the difference signals.

2. A method according to claim 2, wherein the further signal having a random value comprises part of a two-dimensional filtered noise signal.

3. In a method of producing a half-tone representation of an original image, the representation comprising an array of output cell values respectively representing the colour content of pixels of the original image, the improvement comprising generating a plurality of electrical signals indicating cell values for successive output cells, for which cell values have not previously been determined, by:

(a) generating electrical signals indicating an output cell value of each respective pixel of the half-tone representation with reference to an input cell value related to the colour content of a corresponding pixel in the original image, wherein the output cell value comprises a binary value which determines whether the current cell is to be assigned with a half-tone dot;

(b) where the output cell value satisfies a predetermined condition, generating color content signals indicating an effective colour content of a neighbourhood of previously determined output cell values by addressing a look-up table containing a single value for each neighbourhood, wherein the output cell value satisfies the predetermined condition in said step (b) if it assigns the current cell with said half-tone dot;

(c) generating difference signals indicating a difference between the effective colour content and the corresponding input cell value; and (d) repeating step (a) using the difference signals.

4. A method according to claim 1, wherein an effective neighbourhood colour density is set to "0" without reference to the neighbourhood of previously determined output cell values, if the output cell value does not assign a half-tone dot to the current cell.

5. A method according to claim 1, wherein the output cell does not assign a half-tone dot if the input cell value is "0", and assigns a half-tone dot if the input cell value is "1".

6. In a method of producing a half-tone representation of an original image, the representation comprising an array of output cell values respectively representing the colour content of pixels of the original image, the improvement comprising generating a plurality of electrical signals indicating cell values for successive output cells, for which cell values have not previously been determined, by:

(a) obtaining the input cell values from input pixel data related to the colour content of a corresponding pixel in the original image by addressing an input look-up table with random dithering;

(b) generating electrical signals indicating an output cell value of each respective pixel of the half-tone representation with reference to an input cell value related to the colour content of a corresponding pixel in the original image;

(c) where the output cell value satisfies a predetermined condition, generating color content signals indicating an effective colour content of a neighbourhood of previously determined output cell values by addressing a look-up table containing a single value for each neighbourhood;

(d) generating difference signals indicating a difference between the effective colour content and the corresponding input cell value; and (e) repeating step (b) using the difference signals.

7. In a method of producing a half-tone representation of an original image, the representation comprising an array of output cell values respectively representing the colour content of pixels of the original image, the improvement comprising generating a plurality of electrical signals indicating cell values for successive output cells, for which cell values have not previously been determined, by:

(a) scanning successive pixels from the original image using a serpentine raster;

(b) generating electrical signals indicating an output cell value of each respective pixel of the half-tone representation with reference to an input cell value related to the colour content of a corresponding pixel in the original image;

(c) where the output cell value satisfies a predetermined condition, generating color content signals indicating an effective colour content of a neighbourhood of previously determined output cell values by addressing a look-up table containing a single value for each neighbourhood;

(d) generating difference signals indicating a difference between the effective colour content and the corresponding input cell value; and (e) repeating step (b) using the difference signals.

8. In a method of producing a half-tone representation of an original image, the representation comprising an array of output cell values respectively representing the colour content of pixels of the original image, the improvement comprising generating a plurality of electrical signals indicating cell values for successive output cells, for which cell values have not previously been determined, by:

(a) scanning the pixels of the original image using a double serpentine raster, wherein a scanning direction is reversed every other line:

(b) generating electrical signals indicating an output cell value of each respective pixel of the half-tone representation with reference to an input cell value related to the colour content of a corresponding pixel in the original image;

(c) Where the output cell value satisfies a predetermined condition, generating color content signals indicating an effective colour content of a neighbourhood of previously determined output cell values by addressing a look-up table containing a single value for each neighbourhood;

(d) generating difference signals indicating a difference between the effective colour content and the corresponding input cell value; and (e) repeating step (b) using the difference signals.

9. A method according to claim 8, further comprising the step of calculating output cell values for two successive lines in parallel.

10. In a method of producing a half-tone representation of an original image, the representation comprising an array of output cell values respectively representing the colour content of pixels of the original image, the improvement comprising generating a plurality of electrical signals indicating cell values for successive output cells, for which cell values have not previously been determined, by:

(a) generating electrical signals indicating an output cell value of each respective pixel of the half-tone representation with reference to an input cell value related to the colour content of a corresponding pixel in the original image;

(b) where the output cell value satisfies a predetermined condition, generating color content signals indicating an effective colour content of a neighbourhood of previously determined output cell values by addressing a look-up table containing a single value for each neighbourhood, wherein the values in the look-up table containing a single value for each neighbourhood are determined in accordance with measured values from a set of periodic calibration patterns;

(c) generating difference signals indicating a difference between the effective colour content and the corresponding input cell value;

(d) repeating step (a) using the difference signals.

11. A method according to claim 10, wherein the values in the look-up table containing a single value for each neighbourhood are determined by adding a predetermined function of the measured values from at least one calibration pattern.

12. A method according to claim 11, wherein the values in the look-up table containing a single value for each neighbourhood are determined by adding a predetermined function of the measured value from more than one calibration pattern.

13. A method according to claim 10, wherein the set of periodic calibration patterns forms a complete orthogonal set.

14. A method according to claim 10, wherein at least some values in the neighbourhood of previously determined output cell values are determined with reference to more than one calibration pattern.

15. In an apparatus for producing a half-tone representation of a digital image, the representation comprising an array of output cell values respectively representing the colour content of pixels of the original image, the improvement comprising means for generating a plurality of electrical signals indicating cell values for successive output cells, for which cell values have not previously been determined, including:

first means for generating electrical signals indicating an output cell value of each respective pixel of the half-tone representation with reference to an input cell value related to the colour content of a corresponding pixel in the original image;

second means, responsive to satisfaction by the output cell value of a predetermined condition, for generating colour content signals indicating an effective colour content of a neighbourhood of previously determined output cell values by addressing a look-up table containing a single value for each neighbourhood;

third means for generating difference signals indicating a difference between the effective colour content and the corresponding input cell value; and fourth means for adding a further signal having a random value to said difference signals for propagation with said difference signals;

wherein said first means responds to said difference signals to generate said electrical signals indicating an output cell value of each pixel of the half-tone representation.

16. In an apparatus for producing a half-tone representation of a digital image, the representation comprising an array of output cell values respectively representing the colour content of pixels of the original image, the improvement comprising processing apparatus for generating indicating cell values for successive output cells, for which cell values have not previously been determined, the processing apparatus including:

first means for generating an output cell value of each respective pixel of the half-tone representation with reference to an input cell value related to the colour content of a corresponding pixel in the original image;

second means, responsive to satisfaction by the output cell value of a predetermined condition, for generating an effective colour content of a neighbourhood of previously determined output cell values by addressing a look-up table containing a single value for each neighbourhood;

third means for generating a difference between the effective colour content and the corresponding input cell value; and fourth means for adding a further signal having a random value to said difference signals for propagation with said difference signals;

wherein said first means responds to said difference signals to generate an output cell value of each pixel of the half-tone representation.

* * * * *